(12) United States Patent
Nadeau et al.

(10) Patent No.: US 6,508,624 B2
(45) Date of Patent: Jan. 21, 2003

(54) TURBOMACHINE WITH DOUBLE-FACED ROTOR-SHROUD SEAL STRUCTURE

(75) Inventors: Sylvain Nadeau, London (CA); William Holmes, London (CA)

(73) Assignee: Siemens Automotive, Inc., Mississauga (CA)

( * ) Notice: Subject to any disclaimer, the term of this patent is extended or adjusted under 35 U.S.C. 154(b) by 0 days.

(21) Appl. No.: 09/865,983

(22) Filed: May 2, 2001

(65) Prior Publication Data

US 2002/0164247 A1 Nov. 7, 2002

(51) Int. Cl.$^7$ ................................................. F01D 11/08
(52) U.S. Cl. ................................ 415/173.3; 415/173.6; 415/174.2
(58) Field of Search .......................... 415/173.6, 173.3, 415/173.5, 174.2, 174.5, 170.1; 416/189, 192; 277/355

(56) References Cited

U.S. PATENT DOCUMENTS

| | | | |
|---|---|---|---|
| 885,032 A | * 4/1908 | De Ferranti | 277/355 |
| 1,876,067 A | * 8/1932 | Lorenzen | 280/156 |
| 3,680,977 A | * 8/1972 | Rabouyt et al. | 277/369 |
| 3,842,902 A | * 10/1974 | Poslusny | 123/41.49 |
| RE30,206 E | 2/1980 | Ferguson et al. | |
| 4,398,508 A | 8/1983 | Moon et al. | |
| 4,398,866 A | * 8/1983 | Hartel et al. | 415/173.1 |
| 4,526,509 A | * 7/1985 | Gay et al. | 277/413 |
| 5,474,306 A | 12/1995 | Bagepalli et al. | |
| 5,489,186 A | 2/1996 | Yapp et al. | |
| 5,613,829 A | 3/1997 | Wolfe et al. | |
| 5,628,622 A | 5/1997 | Thore et al. | |
| 5,740,766 A | * 4/1998 | Moser | 123/41.49 |
| 5,899,660 A | * 5/1999 | Dodd | 415/108 |
| 5,941,685 A | 8/1999 | Bagepalli et al. | |
| 5,957,661 A | 9/1999 | Hunt et al. | |
| 5,988,975 A | 11/1999 | Pizzi | |
| 6,027,307 A | 2/2000 | Cho et al. | |
| 6,036,437 A | 3/2000 | Wolfe et al. | |
| 6,059,526 A | 5/2000 | Mayr | |
| 6,079,945 A | 6/2000 | Wolfe et al. | |
| 6,012,655 A | 8/2000 | Kreitmeier | |
| 6,164,907 A | 12/2000 | Cybularz et al. | |
| 6,164,911 A | 12/2000 | LeBlanc et al. | |
| 6,168,377 B1 | 1/2001 | Wolf et al. | |
| 6,206,629 B1 | 3/2001 | Reluzco et al. | |

FOREIGN PATENT DOCUMENTS

JP          57044707 A   * 3/1982   ........... F01D/11/08

* cited by examiner

*Primary Examiner*—Edward K. Look
*Assistant Examiner*—Igor Kershteyn

(57) ABSTRACT

A turbomachine for moving air includes a shroud 12 disposed about an axis A. The shroud 12 has a pair of opposing faces 14 and 16 defining a gap 18 therebetween. The opposing faces are disposed generally transversely with respect to the axis. A rotor assembly 13 is mounted for rotation about the axis. The rotor assembly has a plurality of blades 22 with tips of the blades being coupled to an annular band 30. At least a portion 32 of the annular band is disposed in the gap 18. Seal structure 36 extends from each opposing face of the shroud and into the gap to reduce swirl and minimize air leakage across the gap.

12 Claims, 8 Drawing Sheets

US 6,508,624 B2

TURBOMACHINE WITH DOUBLE-FACED ROTOR-SHROUD SEAL STRUCTURE

FIELD OF THE INVENTION

The invention generally relates to fans for use in cooling systems. The invention relates particularly to a seal structure in a gap between the shroud and rotor of the fan to reduce noise by removing the swirling components of air flow at the tip region of fan blades and to minimize air leakage across the gap resulting in fan efficiency gains.

BACKGROUND OF THE INVENTION

A pressure gradient between the pressure side and the suction side of a fan tends to create air leakage at the tip of fan blades. Conventionally, in axial flow fans, tip seals of a labyrinth type have been used to reduce tip air leakage or the flow of air in a gap (on the order of 5 mm) between the shroud and rotor. Ribs have also been used in an effort to reduce this air leakage. A disadvantage of the labyrinth seal is that this seal is difficult to manufacture and that often the axial constraints of the vehicle limit the proper design of the seal. Ribs in the tip region only prevent the swirling component of the flow from causing turbulence by reentering the fan. However, the ribs do not seal the air leakage through the tip gap effectively.

Another common method of reducing tip air leakage is to employ a band connecting the fan blades at the tips thereof. However, due to manufacturing limitations, the radial gap between the stationary shroud and the rotating band is usually on the order of 5 mm which limits the effectiveness of such a seal. Furthermore, the rotating band introduces a swirling component on the leakage flow that tends to increase fan noise.

Accordingly, there is a need to provide a seal structure to decrease the gap between a band of a rotor and shroud and to remove the swirling components of flow in the tip region of a fan so as to reduce noise with marginal losses in static efficiency.

SUMMARY OF THE INVENTION

An object of the invention is to fulfill the need referred to above. In accordance with the principles of the present invention, this objective is achieved by providing a turbomachine for moving air. The turbomachine includes a shroud disposed about an axis. The shroud has a pair of opposing faces defining a gap therebetween. The opposing faces are disposed generally transversely with respect to the axis. A rotor assembly is mounted for rotation about the axis. The rotor assembly has a plurality of blades with tips of the blades being coupled to an annular band. At least a portion of the annular band is disposed in the gap. Seal structure extends from each opposing face of the shroud and into the gap to reduce swirl and minimize air leakage across the gap.

In accordance with another aspect of the invention, a method of reducing effects of air flow between a shroud and a rotor assembly is provided. The shroud is disposed about an axis and has a pair of opposing faces defining a gap therebetween. The opposing faces are disposed generally transversely with respect to the axis. The rotor assembly is mounted for rotation about the axis. The rotor assembly has a plurality of blades with tips of the blades being coupled to an annular band. At least a portion of the annular band is disposed in the gap. The method provides seal structure extending from each opposing face and into the gap to reduce swirl and minimize air leakage across the gap.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIGS. 4–18 are schematic views of tip regions of axial flow fans in accordance with other embodiments of the invention.

DETAILED DESCRIPTION OF THE PREFERRED EMBODIMENT

Figure 1:
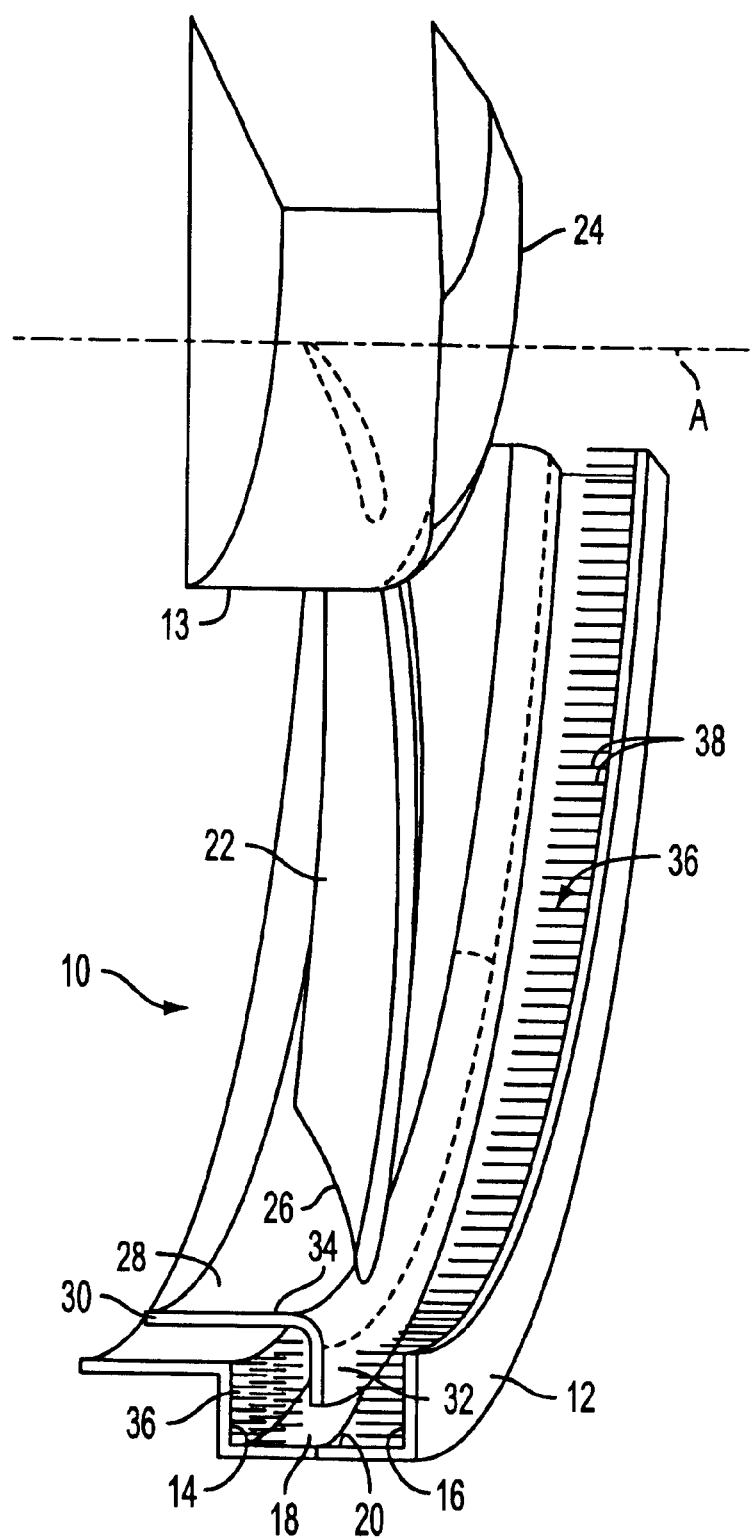
FIG. 1 is a partial perspective view of a tip region of an axial flow fan showing seal structure in the form of bristles disposed in a gap between a shroud and a band of a rotor of the fan, provided in accordance with the principles of the present invention.
Figure 2:
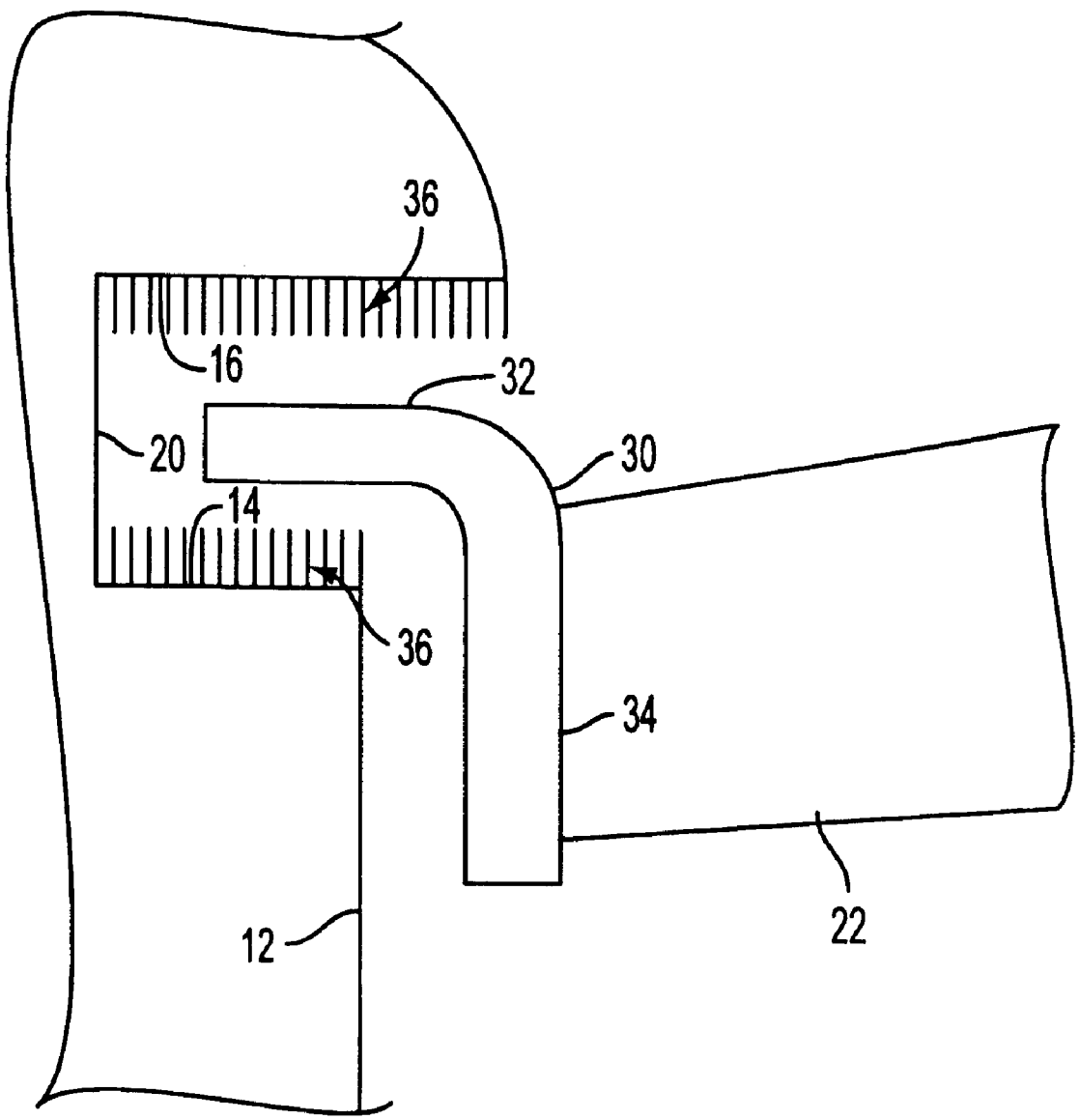
FIG. 2 is a schematic view of a tip region of the axial flow fan of FIG. 1.

With reference to FIG. 1, a tip region of a turbomachine, generally indicated at 10, is shown in accordance with the principles of the present invention. In the illustrated embodiment, the turbomachine 10 is an axial flow type fan having a fixed shroud 12 disposed about an axis A and a rotor assembly 13 rotatable about the axis A. In the embodiments of FIGS. 1–4, the shroud 12 has a pair of opposing faces 14 and 16 defining a gap 18 therebetween. The opposing faces are disposed generally transversely with respect to the axis A. The shroud 12 also includes a wall 20 disposed transversely with respect to the opposing faces 14 and 16 which joins the opposing faces to define a generally U-shaped channel. For ease of manufacture, the U-shaped channel may be made as two molded parts which clip together.

The rotor assembly 13 includes a plurality of fan blades 22, one of which is shown in FIG. 1. Each blade 22 is attached to a hub 24 at one end thereof and a tip 26 of each blade is attached to an inner peripheral wall 28 of an annular band 30. The annular band 30 has a radially extending wall 32 and an axially extending wall 34 coupled to the radially extending wall. The radial extending wall 32 is disposed in the gap 18 so as not to contact any portion of the shroud 12.

Figure 3:
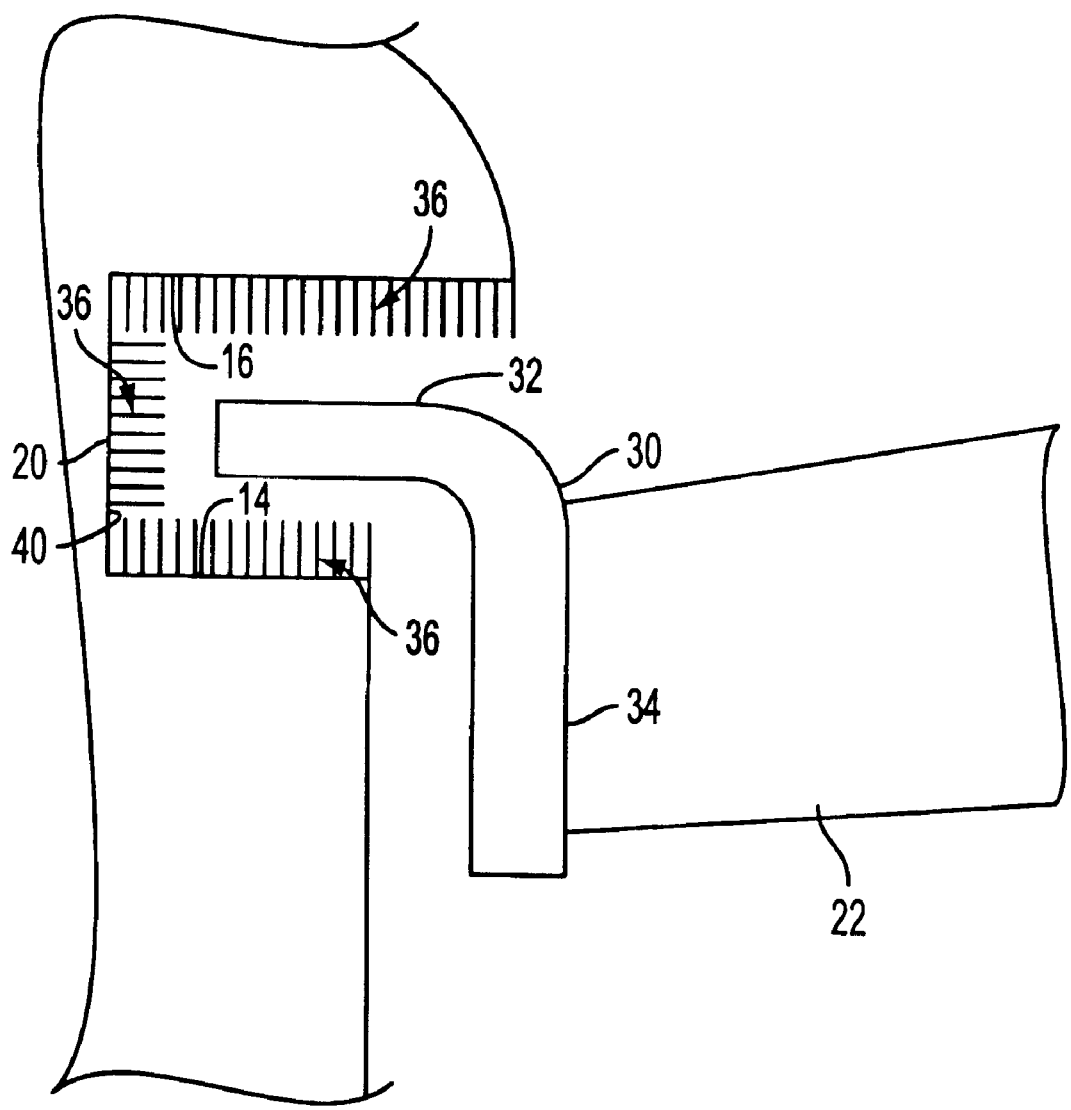
FIG. 3 is a schematic view of a tip region of an axial flow fan in accordance with a second embodiment of the invention.
Figure 4:
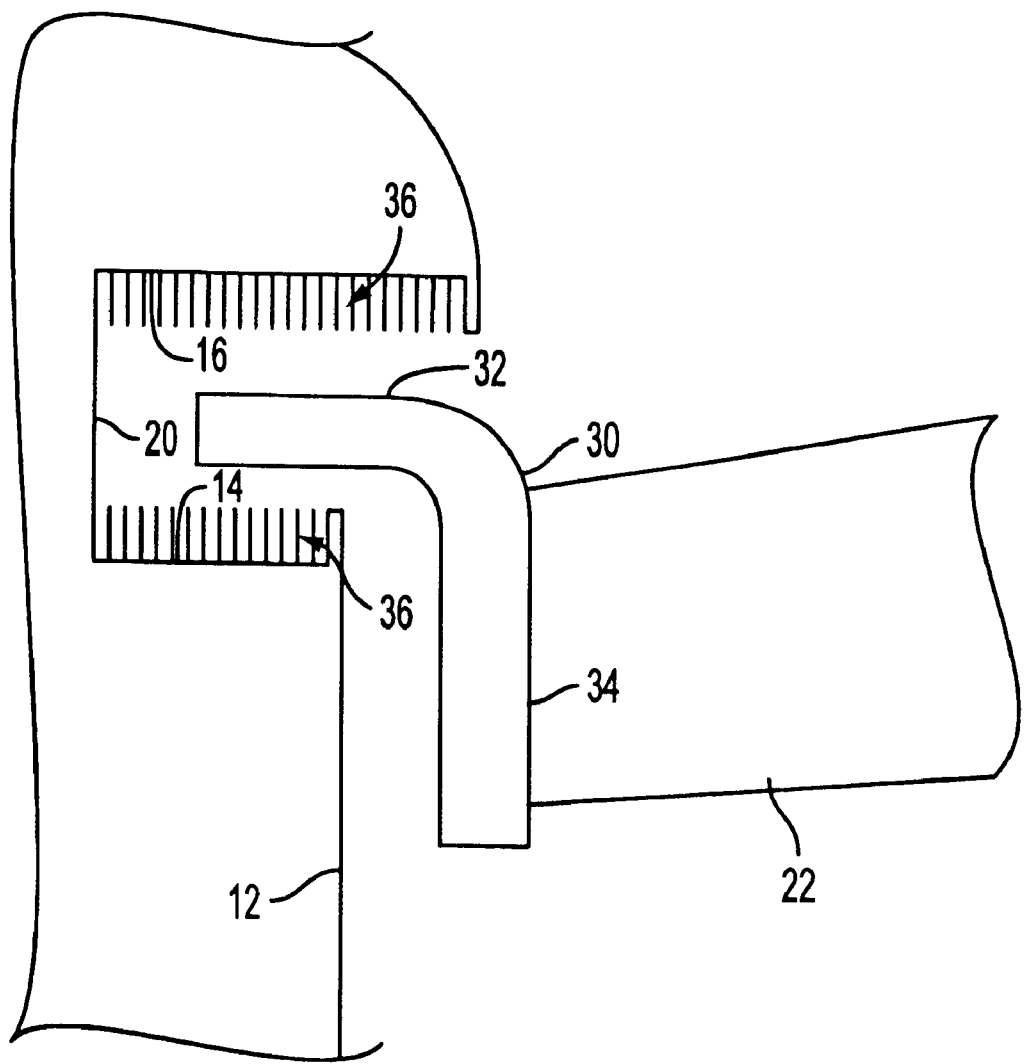
Figure 5:
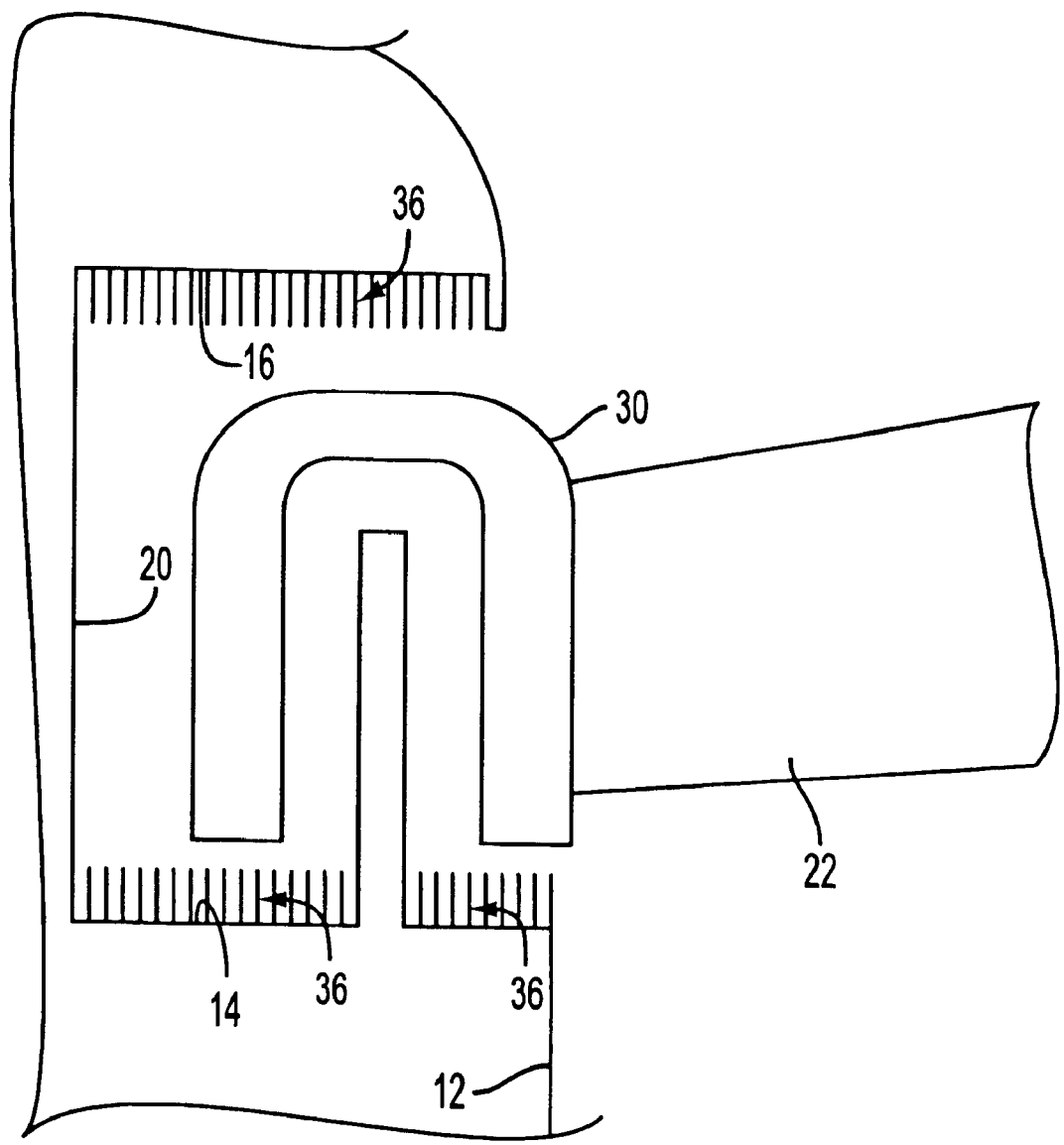
Figure 6:
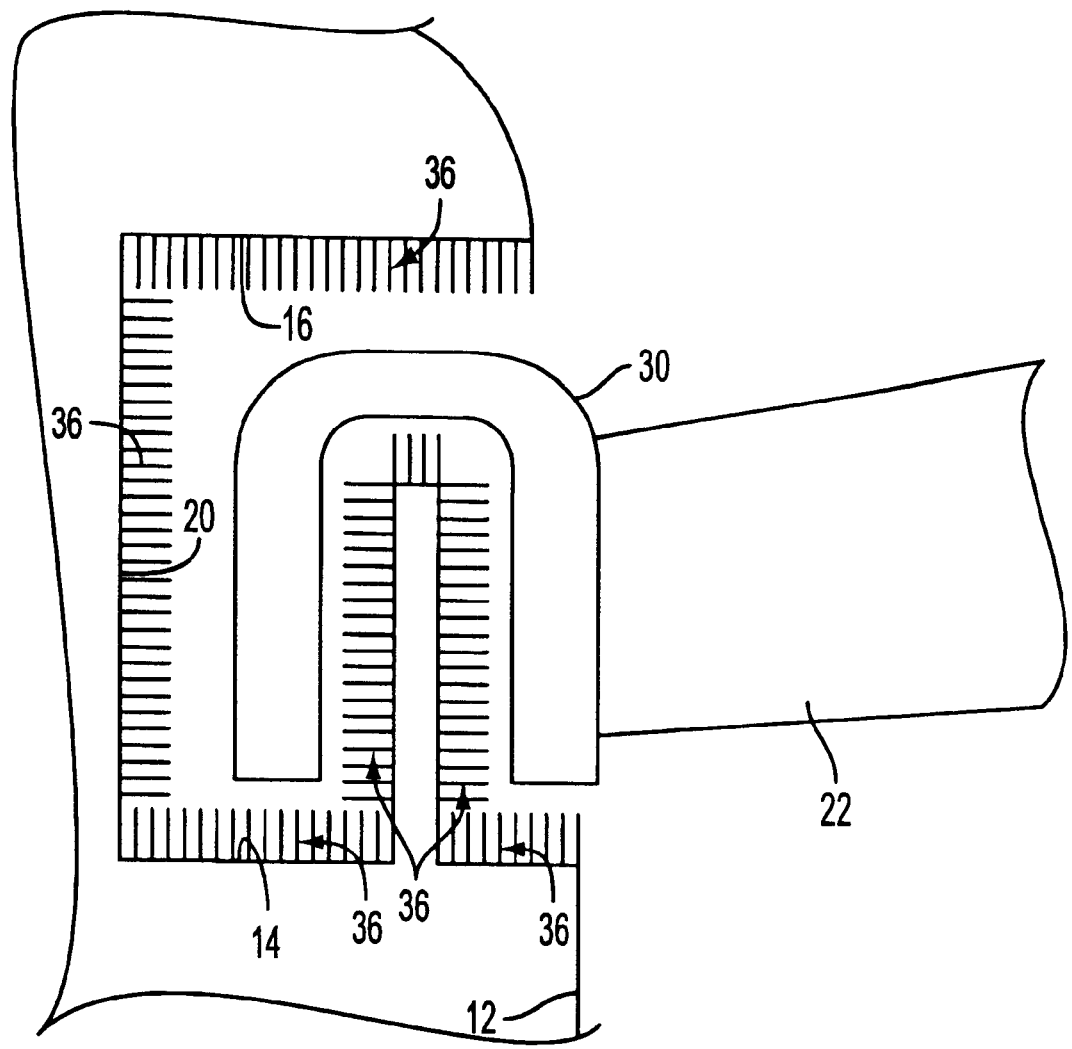
Figure 7:
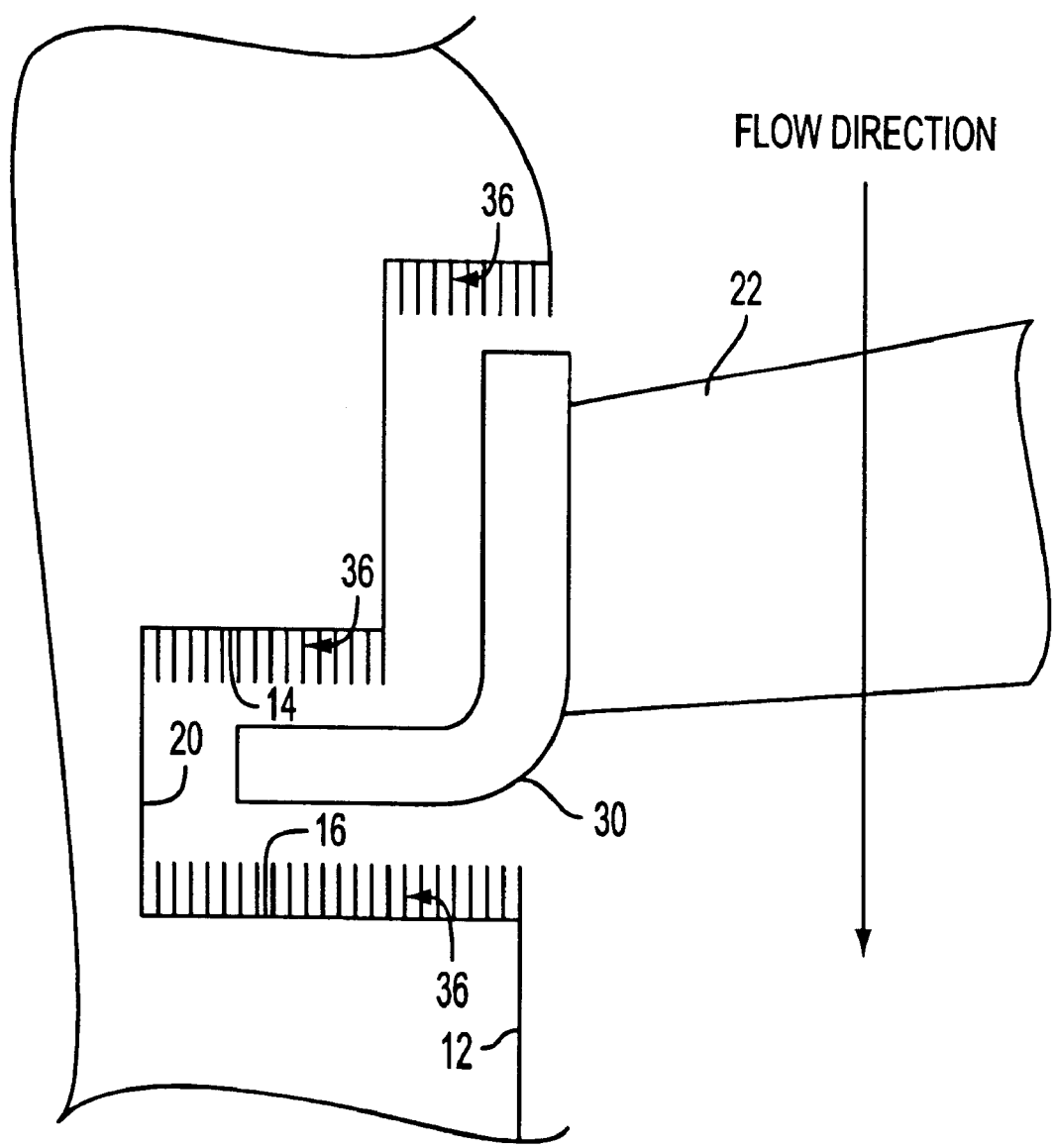
Figure 8:
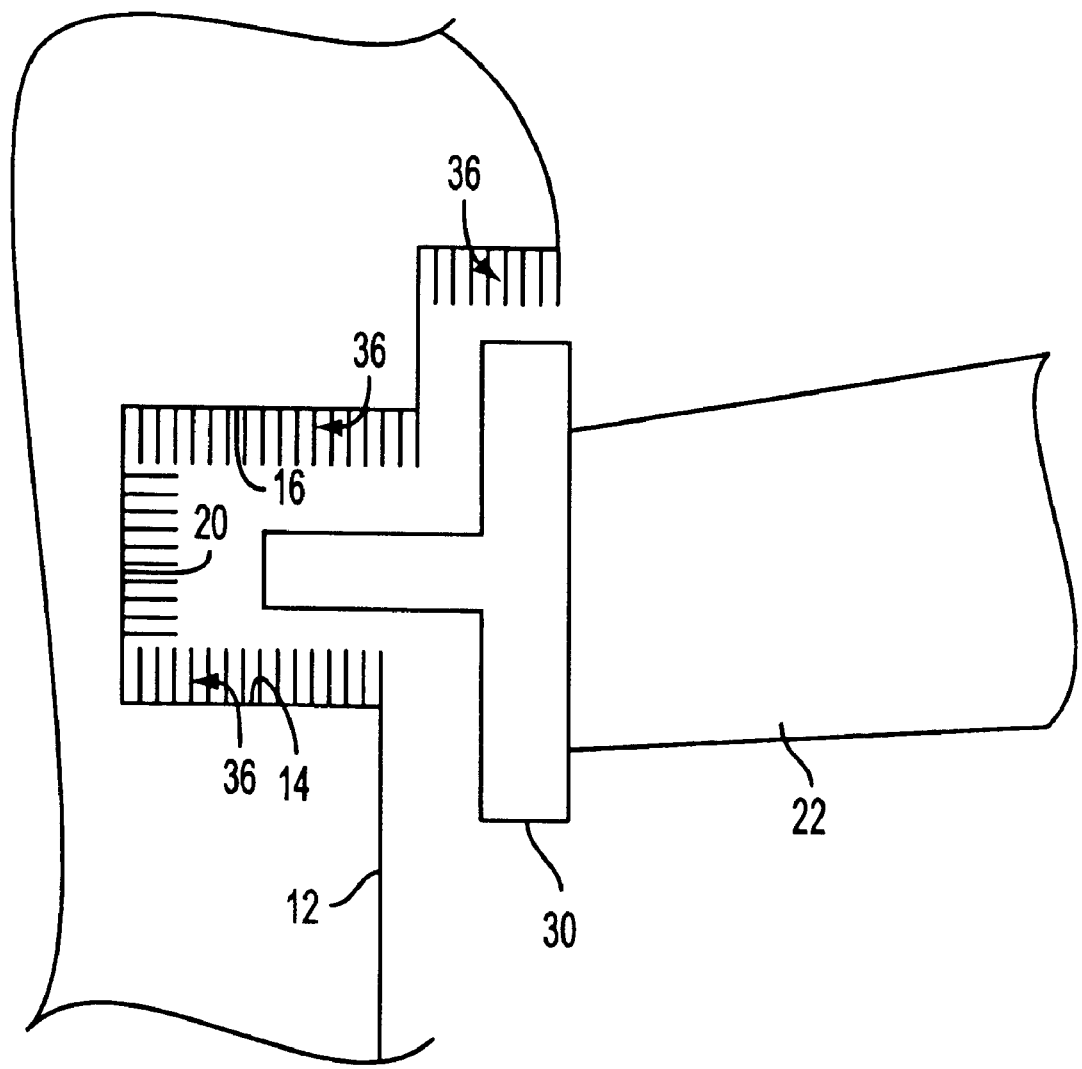

In accordance with the invention, a seal structure, generally indicated at 36, is provided at each of the opposing faces 14 and 16 so as to extend into the gap 18 and disposed generally parallel with respect to the axis A. The seal structure 36 provides a resistance to air flow as air swirls and flows back into the gap 18, and minimizes air leakage across the gap 18. The seal structure 36 can be attached to the faces 14 and 16 of the shroud 12 by any adhesive or may be molded or otherwise formed integrally with the shroud 12. For example, the seal structure may comprise a plurality of bristles 38 which are molded with respect to the faces 14 and 16 as the shroud 12 is molded. In the embodiment shown in FIG. 1, the seal structure 36 comprises a plurality of bristles, filaments or fibers 38 in a dense array, such as, for example, either the loop portion or the hook portion of the conventional hook and loop type fastening system (Velcro®). Thus, the seal structure 36 can comprise a plurality of elastic members mounted on a substrate and adhered to the faces 14 and 16. As shown in FIG. 3, a face 40 of the wall 20 of the shroud 12 can also include the seal structure 36. The seal structure 36 can comprise foam, rubber and other types of flexible, air penetrable material, or a rough grit sandpaper adhered to the shroud 12. Alternatively, in the shroud molding process, the faces 14, 16, and 40 may be roughened so as to provide the same function as sandpaper or can be corresponding stepped surfaces.

The swirl and axial components of velocity now have to travel through or past a highly resistive path of fibers, foam, or a seal material. The sufficiently dense fibers, foam or other seal material dissipates the kinetic energy of the recirculating air flow, thus reducing fan noise and increasing efficiency. The density of the seal structure also reduces the size of the gap 18 and increase the air resistance in the gap 18 to minimize axial leakage flow. The seal structure 36 may be in contact with the radially extending wall 32 of the rotor assembly 24, but a minimum clearance is preferred to reduce the contact noise and rotor torque.

FIGS. 4–8 show different configurations of shrouds 12, having the seal structure 36, and bands 30 of fans in accordance with various embodiments of the invention. The seal structure 36 can be located on any labyrinth surface of the shroud and, the band and shroud can be of any geometry.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A turbomachine for moving air comprising:
   a shroud disposed about an axis, the shroud having a pair of opposing faces defining a gap therebetween, the opposing faces being disposed generally transversely with respect to the axis,
   a rotor assembly mounted for rotation about the axis, the rotor assembly having a plurality of blades, tips of the blades being coupled to an annular band, at least a portion of the annular band being disposed in said gap, and
   seal structure comprising a plurality of fibers extending from each opposing face of the shroud and into the gap so as to be generally parallel with respect to the axis and spaced from the annular band to reduce swirl and minimize air leakage across the gap.

2. The turbomachine of claim 1, wherein the shroud includes a wall disposed transversely with respect to the opposing faces and joining the opposing faces to define a generally U-shaped channel, the portion of the annular band being disposed in the U-shaped channel.

3. The turbomachine of claim 1, wherein the seal structure is mounted to the opposing faces by adhesive.

4. The turbomachine of claim 1, wherein the seal structure comprises a substrate having mounted thereon, said plurality of fibers.

5. The turbomachine of claim 2, wherein said wall includes additional seal structure thereon extending into the U-shaped channel.

6. The turbomachine of claim 1, wherein the annular band has a radially extending wall and an axially extending wall coupled to the radially extending wall, the radial extending wall being disposed in said gap.

7. The turbomachine of claim 1, wherein the seal structure comprises said plurality of fibers molded with respect to the opposing faces.

8. A method of reducing effects of air flow between a shroud and a rotor assembly, the shroud being disposed about an axis and having a pair of opposing faces defining a gap therebetween, the opposing faces being disposed generally transversely with respect to the axis, the rotor assembly being mounted for rotation about the axis, the rotor assembly having a plurality of blades, tips of the blades being coupled to an annular band, at least a portion of the annular band being disposed in said gap, the method including:
   providing seal structure in the form of a plurality of fibers extending from each opposing face and into the gap so as to be generally parallel with respect to the axis and spaced from the annular band to reduce swirl and minimize air leakage across the gap.

9. The method of claim 8, wherein the step of providing the seal structure includes mounting the seal structure to the opposing faces by adhesive.

10. The method of claim 8, wherein the step of providing the seal structure includes providing a substrate having mounted thereon, said plurality of fibers.

11. The method of claim 8, wherein the step of providing the seal structure includes molding the plurality of fibers with respect to the opposing faces.

12. A turbomachine for moving air comprising:
   a shroud disposed about an axis, the shroud having a pair of opposing faces defining a gap therebetween, the opposing faces being disposed generally transversely with respect to the axis,
   a rotor assembly mounted for rotation about the axis, the rotor assembly having a plurality of blades, tips of the blades being coupled to an annular band, at least a portion of the annular band being disposed in said gap, and
   a plurality of bristles extending from each opposing face of the shroud, into the gap and toward the portion of the annular band and spaced from the annular band, to reduce swirl and minimize air leakage across the gap.

* * * * *